(12) United States Patent
Nakashima

(10) Patent No.: US 11,881,781 B2
(45) Date of Patent: Jan. 23, 2024

(54) VOLTAGE CONVERSION DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Arata Nakashima, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 249 days.

(21) Appl. No.: 17/611,750

(22) PCT Filed: Apr. 30, 2020

(86) PCT No.: PCT/JP2020/018215
§ 371 (c)(1),
(2) Date: Nov. 16, 2021

(87) PCT Pub. No.: WO2020/235323
PCT Pub. Date: Nov. 26, 2020

(65) Prior Publication Data
US 2022/0239225 A1 Jul. 28, 2022

(30) Foreign Application Priority Data
May 21, 2019 (JP) ................................ 2019-095066

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0009* (2021.05); *H02M 1/08* (2013.01)

(58) Field of Classification Search
CPC .......................... H02M 3/1582; H02M 1/0009
See application file for complete search history.

(56) References Cited

U.S. PATENT DOCUMENTS

| | | | | | |
|---|---|---|---|---|---|
| 5,477,132 | A | * | 12/1995 | Canter | H02J 7/35 320/101 |
| 8,975,879 | B2 | * | 3/2015 | Xu | H02M 3/158 323/267 |

(Continued)

FOREIGN PATENT DOCUMENTS

| | | |
|---|---|---|
| JP | 2007-068290 A | 3/2007 |
| JP | 2013-236435 A | 11/2013 |

(Continued)

OTHER PUBLICATIONS

International Search Report, Application No. PCT/JP2020/018215, dated Jul. 21, 2020. ISA/Japan Patent Office.

*Primary Examiner* — Jue Zhang
(74) *Attorney, Agent, or Firm* — Honigman LLP

(57) ABSTRACT

Provided is a technology that is able to shorten the time required to switch a PWM signal when driving the voltage conversion unit, and that can determine the duty according to a current value and an internal resistance of a power unit. A voltage conversion device has a current detection unit that detects a current value of a conduction path, an internal resistance detection unit that detects an internal resistance of a first power unit, a determination unit that determines a usage duty, and a drive unit that outputs a PWM signal that depends on the usage duty determined by the determination unit as a control signal. The determination unit determines the usage duty, based on the internal resistance detected by (Continued)

the internal resistance detection unit and the current value detected by the current detection unit.

2 Claims, 7 Drawing Sheets

(56) References Cited

U.S. PATENT DOCUMENTS

2005/0040797 A1\* 2/2005 Sanchez De Castro ..................... H02M 3/1582
                                                                    323/271
2018/0294804 A1\* 10/2018 Ali ................. H02M 3/1582

FOREIGN PATENT DOCUMENTS

| JP | 2015-077933 A | 4/2015 |
| JP | 2018-029454 A | 2/2018 |

\* cited by examiner

LEGEND
A= First power unit
B= Second power unit
C= Load
D= Critical load

LEGEND
A= First power unit
B= Second power unit
C= Load
D= Critical load

VOLTAGE CONVERSION DEVICE

CROSS-REFERENCE TO RELATED APPLICATIONS

This application is the U.S. national stage of PCT/JP2020/018215 filed on Apr. 30, 2020, which claims priority of Japanese Patent Application No. JP 2019-095066 filed on May 21, 2019, the contents of which are incorporated herein.

TECHNICAL FIELD

The present disclosure is related a voltage conversion device.

BACKGROUND

Heretofore, voltage conversion devices that can step down a voltage input from the high voltage side and output the stepped down voltage to the low voltage side, and can step up a voltage input from the low voltage side and output the stepped up voltage to the high voltage side are known. For example, a step up/down converter described in JP 2015-77933A is provided with a voltage conversion unit and a microcomputer that controls the drive of this voltage conversion unit. This microcomputer can detect the voltage value on a 12 V side (low voltage side) and a 48 V side (high voltage side), and, can step-down drive and step-up drive the voltage conversion unit, based on respective detected voltage values.

This step up/down converter step-down drives the voltage conversion unit by outputting a step-down PWM signal, and step-up drives the voltage conversion unit by outputting a step-up PWM signal. This thus involves processing such as determining whether to switch the drive mode, in the case of switching to the other drive in a situation where one of the step-down drive and the step-up drive is being executed, and starting output of the other PWM signal after stopping output of the PWM signal that is currently being output. Accordingly, there is a problem in that switching PWM signals requires a certain amount of time.

In view of this, in the present disclosure, a technology is provided that is able to shorten the time required to switch PWM signals when driving a voltage conversion unit, and that can determine the duty according to a current value and an internal resistance of a power unit.

SUMMARY

A voltage conversion device according to one aspect of the present disclosure having a voltage conversion unit including a first switching element and a second switching element and configured to perform voltage conversion with one of a first conduction path and a second conduction path that are electrically connected to a power unit as an input side and the other thereof as an output side, a first voltage detection unit configured to detect a first voltage value which is a voltage value of the first conduction path, and a second voltage detection unit configured to detect a second voltage value which is a voltage value of the second conduction path, the voltage conversion unit performing a first operation for stepping up or stepping down an input voltage applied to the second conduction path by an on/off operation of the second switching element and applying an output voltage to the first conduction path, and a second operation for stepping up or stepping down an input voltage applied to the first conduction path by an on/off operation of the first switching element and applying an output voltage to the second conduction path, the voltage conversion device including: a current detection unit configured to detect a current value of the first conduction path; an internal resistance detection unit configured to detect an internal resistance of the power unit; a first duty generation unit configured to generate a first duty for approximating the voltage value of the first conduction path to a first target value by a feedback operation based on the voltage value of the first conduction path and the first target value; a second duty generation unit configured to generate a second duty for approximating the voltage value of the second conduction path to a second target value by a feedback operation based on the voltage value of the second conduction path and the second target value; a determination unit configured to determine a usage duty, based on the first duty and the second duty; and a drive unit configured to input a PWM signal that depends on the usage duty determined by the determination unit to one of the first switching element and the second switching element, and to input an inverted signal obtained by inverting the PWM signal to the other switching element, the determination unit determining the usage duty, based on a larger value or a smaller value from when an inverted duty which is a value obtained by subtracting one of the first duty and the second duty from 100 percent and the other duty are compared, the internal resistance detected by the internal resistance detection unit, and the current value detected by the current detection unit.

Advantageous Effects of Invention

According to the present disclosure, the time required to switch PWM signals when driving a voltage conversion unit can be shortened, and the duty can be determined according to a current value and an internal resistance of a power unit.

DETAILED DESCRIPTION OF PREFERRED EMBODIMENTS

Figure 1:
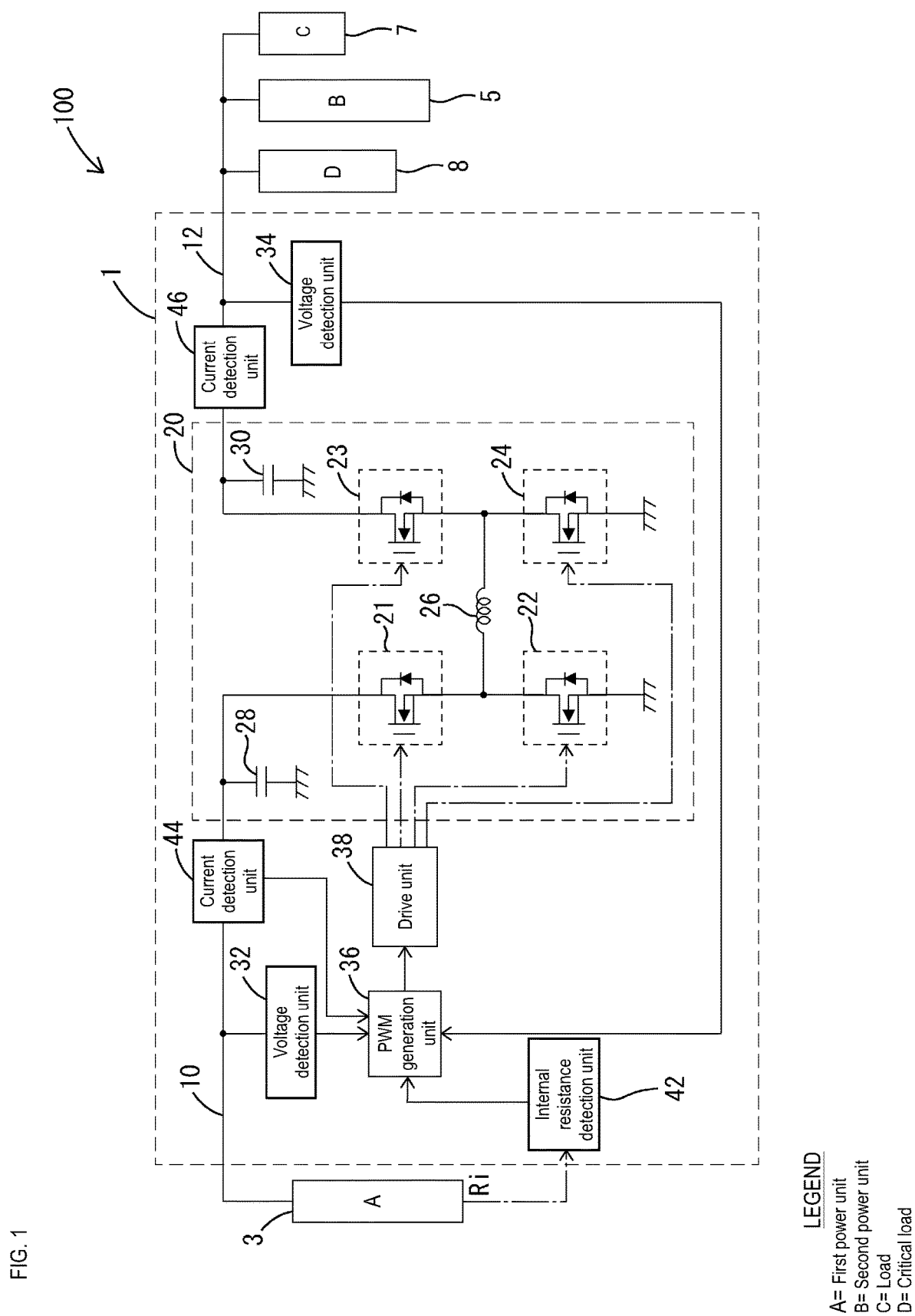
FIG. 1 is a block diagram illustrating a power system provided with a voltage conversion device of a first embodiment.

Initially, embodiments of the present disclosure will be enumerated and described.

A voltage conversion device according to a first mode of the present disclosure has a voltage conversion unit, a first voltage detection unit, and a second voltage detection unit. The voltage conversion unit includes a first switching element and a second switching element, and is configured to perform voltage conversion with one of a first conduction path and a second conduction path that are electrically connected to a power unit as an input side and the other thereof as an output side. The first voltage detection unit is configured to detect a first voltage value which is a voltage value of the first conduction path. The second voltage detection unit is configured to detect a second voltage value which is a voltage value of the second conduction path. The voltage conversion unit performs a first operation for stepping up or stepping down an input voltage applied to the second conduction path by an on/off operation of the second switching element and applying an output voltage to the first conduction path. Furthermore, the voltage conversion unit performs a second operation for stepping up or stepping down an input voltage applied to the first conduction path by an on/off operation of the first switching element and applying an output voltage to the second conduction path.

Furthermore, the above voltage conversion device has a current detection unit, an internal resistance detection unit, a first duty generation unit, a second duty generation unit, a determination unit, and a drive unit. The current detection unit is configured to detect a current value of the first conduction path. The internal resistance detection unit is configured to detect an internal resistance of the power unit. The first duty generation unit is configured to generate a first duty for approximating the voltage value of the first conduction path to a first target value by a feedback operation based on the voltage value of the first conduction path and the first target value. The second duty generation unit is configured to generate a second duty for approximating the voltage value of the second conduction path to a second target value by a feedback operation based on the voltage value of the second conduction path and the second target value. The determination unit is configured to determine a usage duty, based on the first duty and the second duty.

The drive unit is configured to input a PWM signal that depends on the usage duty determined by the determination unit to one of the first switching element and the second switching element, and to input an inverted signal obtained by inverting the PWM signal to the other switching element. The determination unit determines the usage duty, based on a larger value or a smaller value from when an inverted duty which is a value obtained by subtracting one of the first duty and the second duty from 100 percent and the other duty are compared, the above internal resistance, and the above current value.

The above voltage conversion device is capable of continuously calculating/updating both a first duty which is the duty for a first operation and a second duty which is the duty for a second operation. Moreover, the above voltage conversion device determines a usage duty, based on the larger value or smaller value from when "an inverted duty which is a value obtained by subtracting one of the duties from 100 percent" and "the other duty" are compared. In other words, in the case where the magnitude relationship between the inverted duty and the other duty changes when one of the inverted duty and the other duty is being prioritized, the above voltage conversion device is able to immediately switch the duties to respond to the change.

Specifically, in the case of employing a method that involves selecting the larger value of the inverted duty and the other duty, the voltage conversion device operates as follows. For example, if the inverted duty is larger than the other duty, a signal obtained by inverting a PWM signal that is based on the inverted duty is input to one of the switching elements, and the PWM signal that is based on the inverted duty is input to the other switching element. Accordingly, the voltage conversion device performs a first operation that is based on the inverted duty (operation based on one of the duties). On the other hand, if the other duty is larger than the inverted duty, a signal obtained by inverting a PWM signal that is based on the other duty is input to one of the switching elements, and the PWM signal that is based on the other duty is input to the other switching element. Accordingly, the voltage conversion device performs a second operation that is based on the other duty.

In this way, switching between prioritizing the first operation if the inverted duty is larger and prioritizing the second operation if the other duty is larger can be performed immediately, and thus, in the case where the magnitude relationship between the inverted duty and the other duty changes, the duties can be immediately switched to respond to the change.

Also, in the case of employing a method that involves selecting the smaller value of the inverted duty and the other duty, the voltage conversion device operates as follows. For example, if the inverted duty is smaller than the other duty, a signal obtained by inverting a PWM signal that is based on the inverted duty is input to one of the switching elements, and the PWM signal that is based on the inverted duty is input to the other switching element. Accordingly, the voltage conversion device performs a first operation that is based on the inverted duty (operation based on one of the duties). On the other hand, if the other duty is smaller than the inverted duty, a signal obtained by inverting a PWM signal that is based on the other duty is input to one of the switching elements, and the PWM signal that is based on the other duty is input to the other switching element. Accordingly, the voltage conversion device performs a second operation that is based on the other duty.

In this way, switching between prioritizing the first operation if the inverted duty is smaller and prioritizing the second operation if the other duty is smaller can be performed immediately, and thus, in the case where the magnitude relationship between the inverted duty and the other duty changes, the duties can be immediately switched to respond to the change.

Moreover, the above voltage conversion device determines the usage duty based on the above internal resistance and the above current value. Therefore, the above voltage conversion device is not only able to "switch the operation that is prioritized according to the magnitude relationship between the inverted duty and the other duty" but is also to determine the usage duty according to the current value and the internal resistance of the power unit.

In the voltage conversion device of the present disclosure, the determination unit can include a selection unit, a calculation unit, and an output unit. The selection unit can be configured to select the larger value or the smaller value. The calculation unit can be configured to calculate a correction value, based on the internal resistance detected by the internal resistance detection unit and the current value detected by the current detection unit. The output unit can be configured to determine the usage duty, based on a value obtained by adding the value selected by the selection unit and the correction value calculated by the calculation unit, and output a PWM signal whose duty is set to the usage duty. Furthermore, the calculation unit can determine the correction value so as to increase an absolute value of the correction value as a value of the internal resistance increases, and to increase the absolute value of the correction value as the current value increases. Furthermore, the calculation unit can determine the correction value so as to set the correction value to a positive value if current flows through the first conduction path toward the power unit side, and to set the correction value to a negative value if current flows through the first conduction path toward the voltage conversion unit side.

In the case where the above voltage conversion device switches to the other operation when current is flowing toward the power unit through the first conduction path due to one of the first operation and the second operation, for example, the power unit enters a backflow state so as to switch from a charging state to a discharging state. When a backflow occurs in this way, the voltage (input voltage) of the first conduction path drops greatly, and thus the output voltage that is applied to the second conduction path also drops due to the drop in input voltage in the other operation that is performed thereafter. In this case, the output voltage that is applied to the second conduction path drops greatly before stabilizing to approximate a target value (second target value), although the voltage takes time to stabilize when some sort of measure is not implemented. In contrast, with the above voltage conversion device, the correction value is determined so as to be a negative value in the case where the current flows toward the voltage conversion unit side, and thus correction that reduces the usage duty in the case where the power unit switches from the charging state to the discharging state becomes possible. In other words, the above voltage conversion device is able to perform correction so as to lower the duty at an early stage assuming that the output voltage of the second conduction path will decrease in response to switching to the backflow state. Therefore, the above voltage conversion device is able to shorten the time for the output voltage that is applied to the second conduction path to stabilize in proximity to the target value (second target value) in the case of switching from one operation to the other operation.

Also, the voltage drop that occurs on the first conduction path in the case of switching from one operation to the other operation increases as the discharge current that flows through the first conduction path increases, and increases as the internal resistance of the power unit increases. Therefore, if the correction value is determined so as to increase the absolute value of the correction value as the value of internal resistance increases, and to increase the absolute value of the correction value as the current value increases, correction that lowers the usage duty as the voltage drop on the first conduction path increases becomes possible.

First Embodiment

Hereinafter, a first embodiment that embodies the invention will be described.
Basic Configuration of Power System A power system 100 shown in FIG. 1 is constituted as an onboard power system to be mounted in a vehicle or the like, for example. The power system 100 has a configuration provided with a first power unit 3, a second power unit 5 and a voltage conversion device 1, and is constituted as a system that can supply power to a load 7 and a critical load 8 with the first power unit 3 or the second power unit 5 as the power supply source.

The first power unit 3 is constituted as an onboard power storage unit such as an electric double-layer capacitor, a lithium-ion battery or a lead storage battery, for example. The first power unit 3 has a terminal on the high potential side that is electrically connected to a conduction path 10 and a terminal on the low potential side that is electrically connected to ground, and applies a predetermined output voltage to the conduction path 10. Note that, in this description, "voltage" means the potential difference to ground, unless specifically stated otherwise.

The second power unit 5 is constituted as an onboard power storage unit such as an electric double-layer capacitor, a lithium-ion battery or a lead storage battery, for example. The second power unit 5 has a terminal on the high potential side that is electrically connected to a conduction path 12 and a terminal on the low potential side is electrically connected to ground, and applies a predetermined output voltage to the conduction path 12. Note that the output voltage that the second power unit 5 applies to the conduction path 12 may be larger or smaller than the output voltage that the first power unit 3 applies to the conduction path 10.

The load 7 is a starter, for example, and is provided with a motor serving as a drive source and can perform an operation for raising the number of rotations to a state where an engine of the vehicle starts properly. The load 7 is electrically connected to the conduction path 12, and can operate with power that is supplied from the second power unit 5. Also, the load 7 can receive power that is supplied from the first power unit 3 via the voltage conversion device 1. Note that the load 7 is illustrated as being a starter here, but may be a load other than a starter (heater, wiper, audio, etc.).

The critical load 8 is a load such as a shift-by-wire system or an electronic parking brake that is required to continue operating at the time of a main power failure.

The voltage conversion device 1 is provided with a voltage conversion unit 20, voltage detection units 32 and 34, an internal resistance detection unit 42, current detection units 44 and 46, a PWM generation unit 36, and a drive unit 38.

The voltage conversion unit 20 is a circuit that is provided between the conduction path 10 and the conduction path 12, and performs voltage conversion with one of the conduction path 10 and the conduction path 12 as the input side and the other thereof as the output side. The voltage conversion unit 20 is constituted as a known H-bridge circuit.

The voltage conversion unit 20 is provided with a switching element 21, a switching element 22, a switching element 23, a switching element 24, and an inductor 26. The voltage conversion unit 20 performs a step-up operation or a step-down operation with the voltage applied to the conduction path 12 as the input voltage, and performs an operation for applying the output voltage to the conduction path 10. Also, the voltage conversion unit 20 performs a step-down operation or a step-up operation with the voltage applied to the conduction path 10 as the input voltage, and performs an operation for applying the output voltage to the conduction path 12.

In the example in FIG. 1, the switching element 21 is an element on the high side, and the switching element 22 is an element on the low side. The switching elements 21 and 22 are constituted as N-channel MOSFETs. The conduction path 10 is electrically connected to the drain of the switching element 21, and the voltage of the conduction path 10 is applied to the drain. The drain of the switching element 22 and one end of the inductor 26 are electrically connected to the source of the switching element 21. The drain of the switching element 22 is connected to the connection point between the switching element 21 and the inductor 26. The source of the switching element 22 is electrically connected to ground, and the ground voltage (e.g., 0 V) is applied.

Also, the switching element 23 is an element on the high side, and the switching element 24 is an element on the low side. The switching elements 23 and 24 are constituted as N-channel MOSFETs. The conduction path 12 is electrically connected to the drain of the switching element 23, and the voltage of the conduction path 12 is applied to the drain. The drain of the switching element 24 and the other end of the inductor 26 are electrically connected to the source of the switching element 23. The drain of the switching element 24 is connected to the connection point between the switching element 23 and the inductor 26. The source of the switching element 24 is electrically connected to ground, and the ground voltage (e.g., 0 V) is applied.

The voltage conversion unit 20 is provided with a capacitor 28 and a capacitor 30. One end of the capacitor 28 is electrically connected to the conduction path 10, and the other end is electrically connected to ground. One end of the capacitor 30 is electrically connected to the conduction path 12, and the other end is electrically connected to ground.

The voltage detection unit 32 and the voltage detection unit 34 are constituted as voltage detection circuits. The voltage detection unit 32 detects the voltage value of the conduction path 10, and outputs an analog voltage indicating the detected voltage value to the PWM generation unit 36. The voltage detection unit 34 detects the voltage value of the conduction path 12, and outputs an analog voltage indicating the detected voltage value to the PWM generation unit 36.

The current detection unit 44 detects the current value of current flowing through the conduction path 10. The current value of current flowing through the conduction path 10 is a positive value in the case of flowing through the conduction path 10 toward the first power unit 3, and is a negative value in the case of flowing through the conduction path 10 toward the voltage conversion unit 20. The current detection unit 46 detects the current value of current flowing through the conduction path 12. The current value of current flowing through the conduction path 12 is a positive value in the case of flowing through the conduction path 12 toward the second power unit 5, and is a negative value in the case of flowing through the conduction path 12 toward the voltage conversion unit 20.

The internal resistance detection unit 42 detects the internal resistance of the first power unit 3 (power unit) with a known method. The method for measuring the internal resistance of the first power unit 3 (power unit) may be any known method that can be installed in a vehicle, and the internal resistance of the first power unit 3 can be measured with methods disclosed in JP 2018-170821A, JP 2017-123748A and JP 2013-253809A, for example.

The PWM generation unit 36 operates to generate a PWM signal based on the voltage value of the conduction path 10 detected by the voltage detection unit 32 and the voltage value of the conduction path 12 detected by the voltage detection unit 34, and output the PWM signal to the drive unit 38.

Next, a representative example regarding the details of the voltage conversion device will be described.

Note that, in the representative example described below, the conduction path 10 corresponds to an example of the first conduction path, the conduction path 12 corresponds to an example of the second conduction path, and the first power unit 3 corresponds to an example of the power unit. Also, the voltage detection unit 32 corresponds to an example of the first voltage detection unit, and the voltage value of the conduction path 10 corresponds to an example of the first voltage value. Furthermore, the voltage detection unit 34 corresponds to an example of the second voltage detection unit, and the voltage value of the conduction path 12 corresponds to an example of the second voltage value. Furthermore, the switching element 21 corresponds to an example of the first switching element, and the switching element 22 corresponds to an example of the second switching element. Also, a duty generation unit 73 corresponds to an example of the first duty generation unit, and a duty generation unit 79 corresponds to an example of the second duty generation unit.

Also, in the representative example described below, the output voltage that the second power unit 5 applies to the conduction path 12 is larger than the output voltage that the first power unit 3 applies to the conduction path 10. The voltage conversion unit 20 performs the first operation so as to use the conduction path 12 side as the input side and to use the conduction path 10 side as the output side. Specifically, the first operation is performed so as to step up the input voltage applied to the conduction path 12 (second conduction path) by the on/off operation of the switching element 22 (second switching element) and apply the output voltage to the conduction path 10 (first conduction path). Also, the voltage conversion unit 20 performs the second operation so as to use the conduction path 10 side as the input side and to use the conduction path 12 side as the output side. Specifically, the voltage conversion unit 20 performs the second operation so as to step down the input voltage applied to the conduction path 10 (first conduction path) by the on/off operation of the switching element 21 (first switching element) and apply the output voltage to the conduction path 12 (second conduction path). Note that, in this case, the switching element 23 need only be set to an ON state and the switching element 24 need only be set to an OFF state, at the time of both the first operation (step-up operation) and the second operation (step-down operation).

Figure 2:
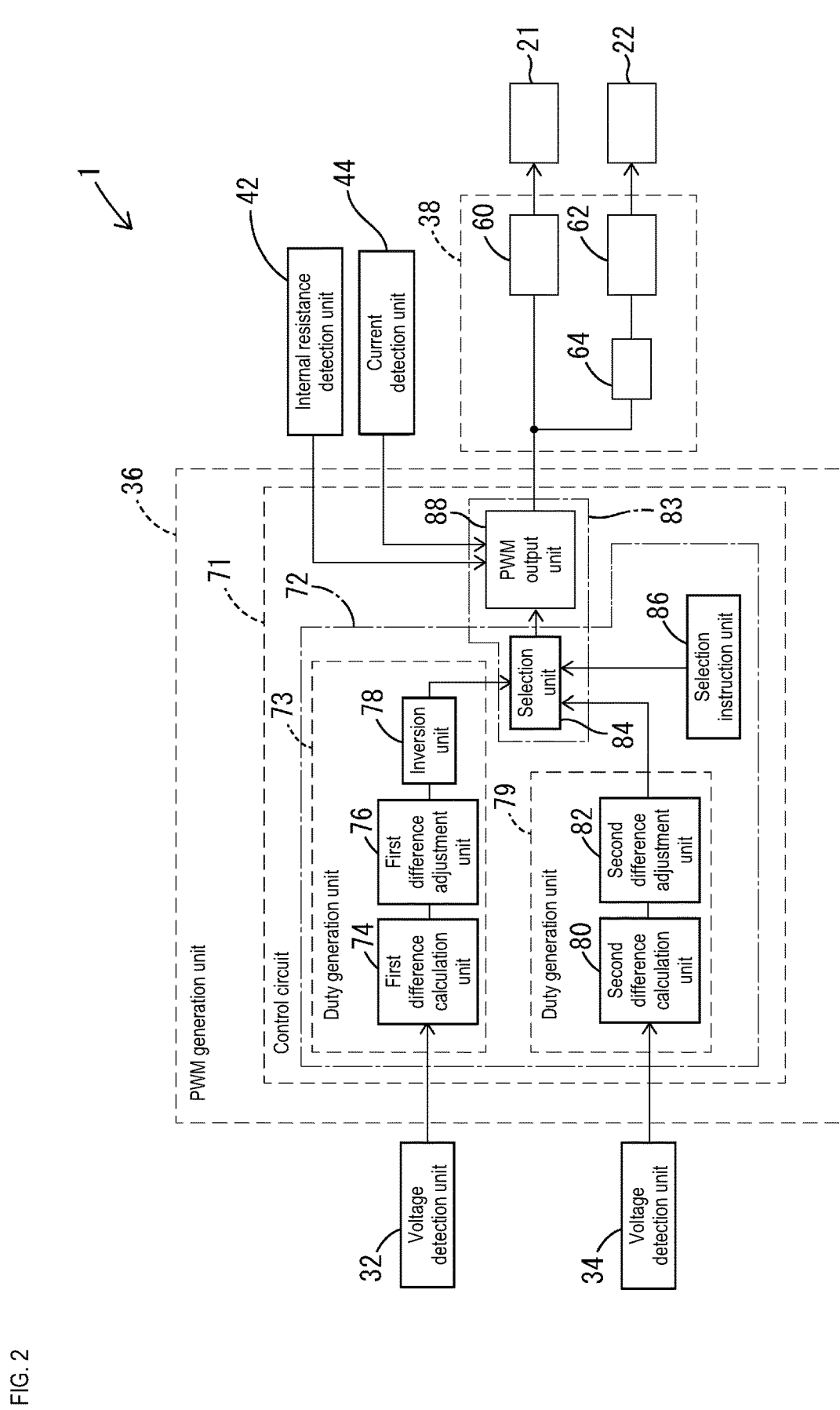
FIG. 2 is a block diagram conceptually illustrating the voltage conversion device of the first embodiment.

FIG. 2 shows the PWM generation unit 36 together with related portions, and is a functional block diagram conceptually showing the respective functions of the PWM generation unit 36 in blocks. As shown in FIG. 2, the PWM generation unit 36 is primarily provided with a control circuit 71. The control circuit 71 is constituted as an MCU (Microcontroller Unit), for example, and is constituted to be provided with a computational processing unit consisting of a CPU (Central Processing Unit) or the like and a storage unit consisting of a ROM, RAM or the like.

In the PWM generation unit 36, an A/D converter can be provided inside or outside the control circuit 71, and this A/D converter operates to convert an input analog voltage into a digital value. For example, the voltage values (analog voltages indicating voltage values) that are input from the voltage detection units 32 and 34 and the internal resistance (analog voltage indicating internal resistance) that is input from the internal resistance detection unit 42 are converted into digital data by the A/D converter. The current values (analog voltages indicating current values) that are input from the current detection units 44 and 46 are also converted into digital data by the A/D converter. This digital data is utilized by the duty generation unit 73, the duty generation unit 79, a PWM output unit 88, and the like. Note that, with regard to data of the first target value and the second target value, a configuration need only be adopted in which the PWM generation unit 36 can hold the data, and data is provided to the PWM generation unit 36 by an external device which is not shown, for example.

Figure 3:
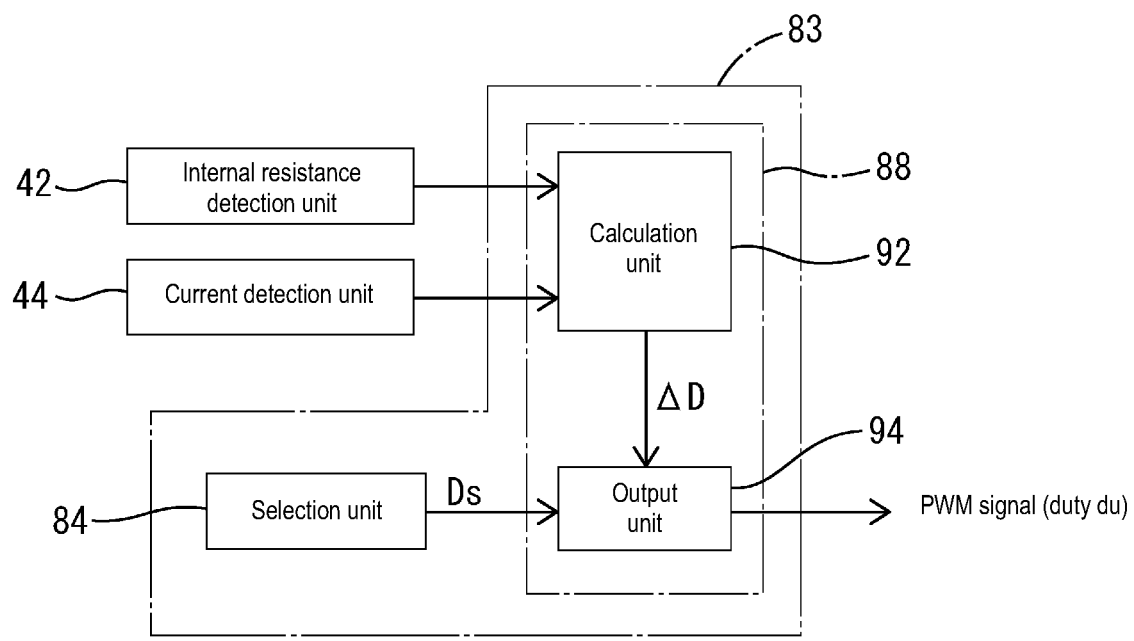
FIG. 3 is a block diagram conceptually illustrating a determination unit and related configuration in the voltage conversion device of the first embodiment.

As shown in FIG. 2, the control circuit 71 is primarily provided with an arbitration unit 72 and the PWM output unit 88. The arbitration unit 72 is provided with the duty generation unit 73, the duty generation unit 79, a selection unit 84, and a selection instruction unit 86. As shown in FIG. 3, the PWM output unit 88 is provided with a calculation unit 92 and an output unit 94. The selection unit 84 and the PWM output unit 88 function as a determination unit 83, and function to determine a usage duty Du, based on a first duty D1 and a second duty D2. In this way, the control circuit 71 functions as the duty generation unit 73, the duty generation unit 79, the selection unit 84, and the determination unit 83, and, furthermore, also functions as the calculation unit 92 and the output unit 94.

The arbitration unit 72 is provided with the duty generation unit 73, the duty generation unit 79, the selection unit 84, the selection instruction unit 86 and the like, and is a portion that determines which of the first duty D1 and the second duty D2 is to be used.

The duty generation unit 73 generates the first duty D1 for approximating the voltage value (first voltage value V1) of the conduction path 10 (first conduction path) to a first target value Vt1 by a feedback operation that is based on the voltage value of the conduction path 10 and the first target value Vt1. The duty generation unit 73 has a first difference calculation unit 74 and a first difference adjustment unit 76.

The first difference calculation unit 74 calculates a first difference (first deviation $\Delta V1$) which is the difference between the first voltage value V1 and the first target value Vt1. Specifically, the first difference (first deviation $\Delta V1$) is calculated by the equation $\Delta V1=Vt1-V1$, with $\Delta V1$ being the value obtained by subtracting the first voltage value V1 from the first target value Vt1. The first difference adjustment unit 76 repeats the operation for calculating the first difference (first deviation $\Delta V1$) at short time intervals.

The first difference adjustment unit 76 calculates the first duty D1 so as to approximate the voltage value of the conduction path 10 to the first target value Vt1 by a known feedback operation method (e.g., PI operation method, PID operation method, etc.), based on the above first difference (first deviation $\Delta V1$). Note that the first difference adjustment unit 76 repeats the feedback operation for calculating the first duty D1 at short time intervals. In order to employ such a method, the first difference adjustment unit 76 updates the first duty D1 so as to maintain the current first duty D1 in the case where the first voltage value V1 is the same as the first target value Vt1. Also, the first difference adjustment unit 76 updates the first duty D1 to increase as the amount by which the first voltage value V1 is under the first target value Vt1 increases. Furthermore, the first difference adjustment unit 76 updates the first duty D1 to decrease as the amount by which the first voltage value V1 is over the first target value Vt1 increases.

An inversion unit 78 calculates a value obtained by subtracting first duty D1(%) from 100(%) (100(%)−D1(%)) as an inverted duty Dr (%), based on the first duty D1 calculated by the first difference adjustment unit 76. In other words, Dr (%)=100(%)−D1(%).

The duty generation unit 79 generates the second duty D2 for approximating the voltage value (second voltage value V2) of the conduction path 12 (second conduction path) to a second target value Vt2 by a feedback operation that is based on the voltage value of the conduction path 12 and the second target value Vt2. The duty generation unit 79 has a second difference calculation unit 80 and a second difference adjustment unit 82.

The second difference calculation unit 80 calculates a second difference (second deviation $\Delta V2$) which is the difference between the second voltage value V2 and the second target value Vt2. Specifically, the second difference (second deviation $\Delta V2$) is calculated by the equation $\Delta V2=Vt2-V2$, with $\Delta V2$ being the value obtained by subtracting the second voltage value V2 from the second target value Vt2. The second difference adjustment unit 82 repeats the operation for calculating the second difference (second deviation $\Delta V2$) at short time intervals.

The second difference adjustment unit 82 calculates the second duty D2 so as to approximate the voltage value of the conduction path 12 to the second target value Vt2 by a known feedback operation method (e.g., PI operation method, PID operation method, etc.), based on the above second difference (second deviation $\Delta V2$). Note that the second difference adjustment unit 82 repeats the feedback operation for calculating the second duty D2 at short time intervals. In order to employ such a method, the second difference adjustment unit 82 updates the second duty D2 so as to maintain the current second duty D2 in the case where the second voltage value V2 is the same as the second target value Vt2. Also, the second difference adjustment unit 82 updates the second duty D2 to increase as the amount by which the second voltage value V2 is under the second target value Vt2 increases. Furthermore, the second difference adjustment unit 82 updates the second duty D2 to decrease as the amount by which the second voltage value V2 is over the second target value Vt2 increases.

The selection unit 84 selects the larger value or smaller value from when the inverted duty Dr (value obtained by subtracting first duty D1 from 100%) and the second duty D2 are compared. Note that, hereinafter, the value selected by the selection unit 84 will also be referred to as a selected duty Ds. In this example, the first duty D1 corresponds to an example of one duty and the second duty D2 corresponds to an example of the other duty. Whether the selection unit 84 selects the larger value or the smaller value is determined by an instruction from the selection instruction unit 86. For example, the selection instruction unit 86 outputs a first signal in the case of instructing selection of "the larger value", and outputs a second signal in the case of instructing selection of "the smaller value". In this case, if the first signal is being output by the selection instruction unit 86, the selection unit 84 selects the larger value out of the inverted duty Dr and the second duty D2. Also, if the second signal is being output by the selection instruction unit 86, the selection unit 84 selects the smaller value out of the inverted duty Dr and the second duty D2. Note that the instruction method used by the selection instruction unit 86 is not limited to the above example, and may be an instruction method that involves storing flag information in the case of instructing selection of "the larger value", and not storing flag information in the case of instructing selection of "the smaller value", for example.

The determination unit 83 determines the usage duty Du, based on the larger value or smaller value (specifically, selected duty Ds) from when the inverted duty Dr and the second duty D2 are compared, an internal resistance Ri, and the current value of the conduction path 10. The determination unit 83 is constituted to be provided with the selection unit 84 and the PWM output unit 88, and the PWM output unit 88 is constituted to be provided with the calculation unit 92 and the output unit 94.

The calculation unit 92 determines a correction value $\Delta D$, based on the internal resistance detected by the internal resistance detection unit and the current value detected by the current detection unit. The calculation unit 92 determines the correction value $\Delta D$ with a method that increases the absolute value of the correction value as the value of the internal resistance increases, and increases the absolute value of the correction value as the current value increases.

Furthermore, the calculation unit 92 determines the correction value ΔD so as to set the correction value to a positive value if current flows through the first conduction path toward the power unit side, and to set the correction value to a negative value if current flows through the first conduction path toward the voltage conversion unit side.

Specifically, the calculation unit 92 calculates the correction value ΔD by the following equation 1. In equation 1, ΔD is the correction value, and G is a constant (fixed value) determined in advance in order to determine the degree of increase/decrease of the correction value, and may be 1 and may also be a positive number less than 1. Also, Ri is the internal resistance of the power unit that is electrically connected to the first conduction path, and, in this representative example, the internal resistance value of the first power unit 3 that is detected by the internal resistance detection unit 42 can be used. Also, I1 is the current value of the first conduction path, and, in this representative example, the current value of the conduction path 10 that is detected by the current detection unit 44 can be used. Also, V2 is the voltage value of the second conduction path, and, in this representative example, the voltage value of the conduction path 12 that is detected by the voltage detection unit 34 can be used.

$$\Delta D = G \frac{Ri \cdot I1}{V2} \qquad \text{Equation 1}$$

The output unit 94 determines the usage duty Du, based on a value (Ds+ΔD) obtained by adding the value (selected duty Ds) selected by the selection unit 84 and the correction value ΔD calculated by the calculation unit 92. Specifically, Du=Ds+ΔD. The output unit 94 then outputs a PWM signal set to the usage duty Du. The PWM signal of the duty Du that is output by the output unit 94 is input to the drive unit 38.

The drive unit 38 inputs a PWM signal that depends on the usage duty Du determined by the determination unit 83 to one of the first switching element and the second switching element. In the example in FIG. 2, the switching element 21 (first switching element) corresponds to an example of one switching element. Also, the drive unit 38 inputs an inverted signal obtained by inverting the PWM signal that depends on the usage duty Du determined by the determination unit 83 to the other switching element. In the example in FIG. 2, the switching element 22 (second switching element) corresponds to an example of the other switching element. In this way, the drive unit 38 drives the voltage conversion unit 20, by generating PWM signals that are complementary to each other, and providing the PWM signals to the gates of the switching elements 21 and 22.

The drive unit 38 is provided with FET drive circuits 60 and 62 and a PWM inversion circuit 64. The FET drive circuit 60 outputs a PWM signal of comparable duty to the duty of the input PWM signal (PWM signal output by PWM output unit 88). The FET drive circuit 60 provides an ON signal to the gate of the switching element 21 during the period in which the input PWM signal (PWM signal output by PWM output unit 88) is a high-level signal. Also, the FET drive circuit 60 provides an OFF signal to the gate of the switching element 21 during the period in which the input PWM signal is a low-level signal. The ON signal that the FET drive circuit 60 provides to the gate of the switching element 21 is set to a voltage that can turn on the switching element 21.

The PWM inversion circuit 64 functions to invert the PWM signal output by the PWM generation unit 36. The PWM inversion circuit 64 is arranged between the FET drive circuit 62 and the connection point between the PWM generation unit 36 and the FET drive circuit 60. The PWM inversion circuit 64 output a low-level signal during the period in which the input PWM signal (PWM signal output by PWM output unit 88) is a high-level signal, and outputs a high-level signal during the period in which the input PWM signal is a low-level signal.

The FET drive circuit 62 outputs a PWM signal of comparable duty to the duty of the input PWM signal (PWM signal output by PWM inversion circuit 64). The FET drive circuit 62 provides an ON signal to the gate of the switching element 22 during the period in which the input PWM signal (PWM signal output by PWM inversion circuit 64) is a high-level signal. In other words, the FET drive circuit 62 provides an ON signal to the gate of the switching element 22 during the period in which the PWM signal output by PWM output unit 88 is a low-level signal. Also, the FET drive circuit 62 provides an OFF signal to the gate of the switching element 22 during the period in which the input PWM signal is a low-level signal. In other words, the FET drive circuit 62 provides an OFF signal to the gate of the switching element 22 during the period in which the PWM signal output by PWM output unit 88 is a high-level signal. The ON signal that the FET drive circuit 62 provides to the gate of the switching element 22 is set to a voltage that can turn on the switching element 22.

Next, operations of the voltage conversion device 1 will be described. In the following example, the voltage conversion device 1 can be caused to function as backup power device, the second power unit 5 can be caused to function as a main power source, and the first power unit 3 can be caused to function as an auxiliary power source.

First, the case where the selection instruction unit 86 shown in FIG. 2 sets (instructs) selection of "the larger value" will be described. In this case, if the inverted duty Dr that is generated by the duty generation unit 73 is larger than the second duty D2 that is generated by the duty generation unit 79, the inverted duty Dr will be selected as the selected duty Ds by the selection unit 84. In the output unit 94 shown in FIG. 3, a value (Dr-FAD) obtained by adding the inverted duty Dr and the correction value ΔD is then set as the usage duty Du. Accordingly, a PWM signal that is based on the inverted duty Dr (specifically, PWM signal whose duty is set to (Dr+ΔD)) will be input as the PWM signal to the drive unit 38 shown in FIG. 2.

The drive unit 38 inputs a PWM signal of the same duty as a PWM signal obtained by inverting the PWM signal input thereto (PWM signal whose duty is set to (Dr+ΔD)) to the switching element 22 (second switching element). Also, the drive unit 38 inputs a PWM signal of the same duty as the PWM signal that is input thereto to the switching element 21 (first switching element). In this case, a PWM signal whose duty is set to the first duty D1 is input to the switching element 22, and thus a step-up operation is performed to approximate the voltage value of the conduction path 10 (first conduction path) to the first target value Vt1. In this case, the step-up operation is performed to charge the first power unit 3 based on the power of the second power unit 5, as shown conceptually by the bold arrow in FIG. 4.

Figure 4:
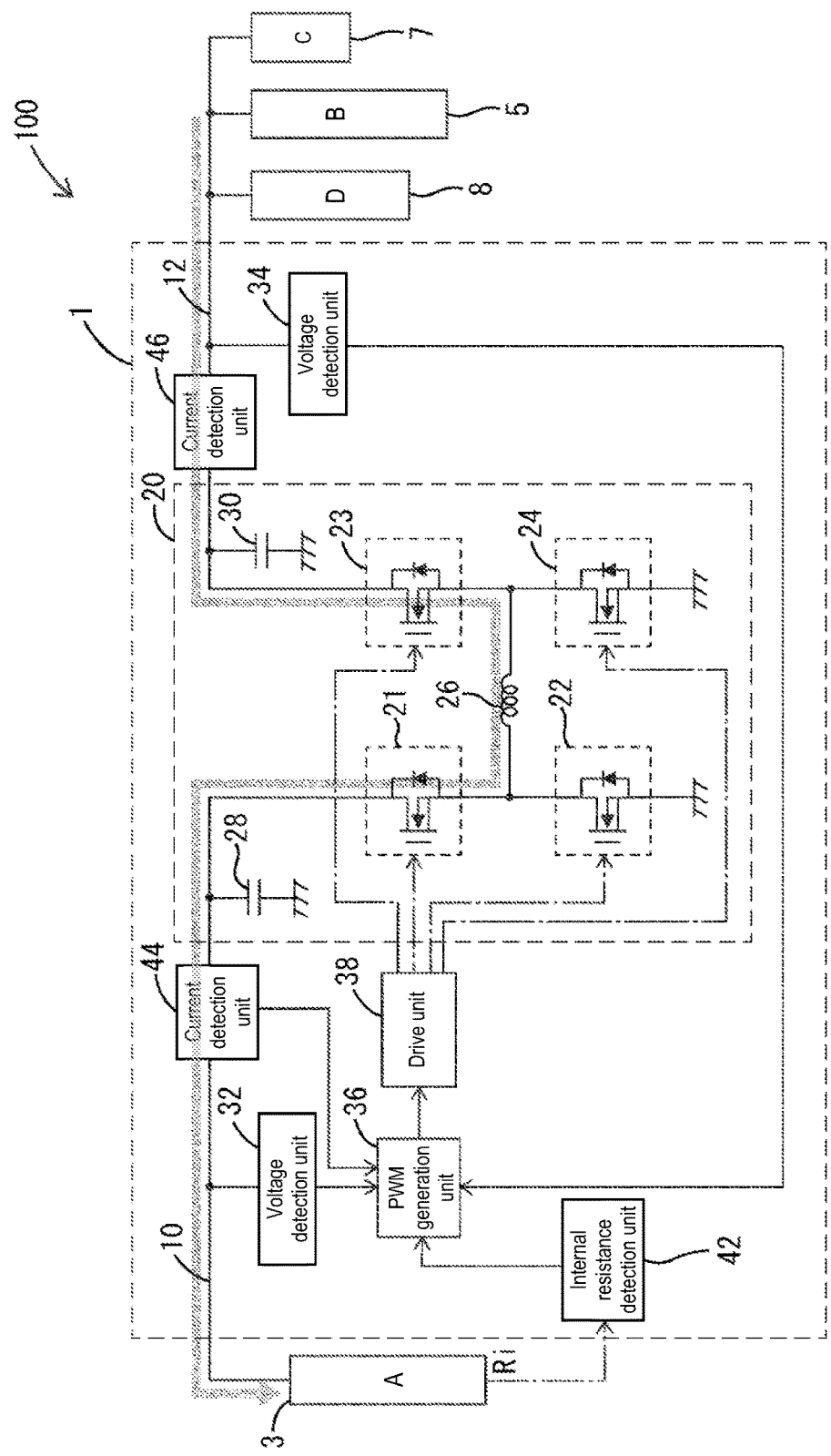
FIG. 4 is a block diagram conceptually illustrating a state during a first operation of the voltage conversion device of the first embodiment.

When the second duty D2 becomes larger than the inverted duty Dr for some reason when the step-up operation is being performed to charge the first power unit 3 as shown in FIG. 4, switching to a discharge operation for releasing charge stored in the first power unit 3 is performed immediately.

Figure 5:
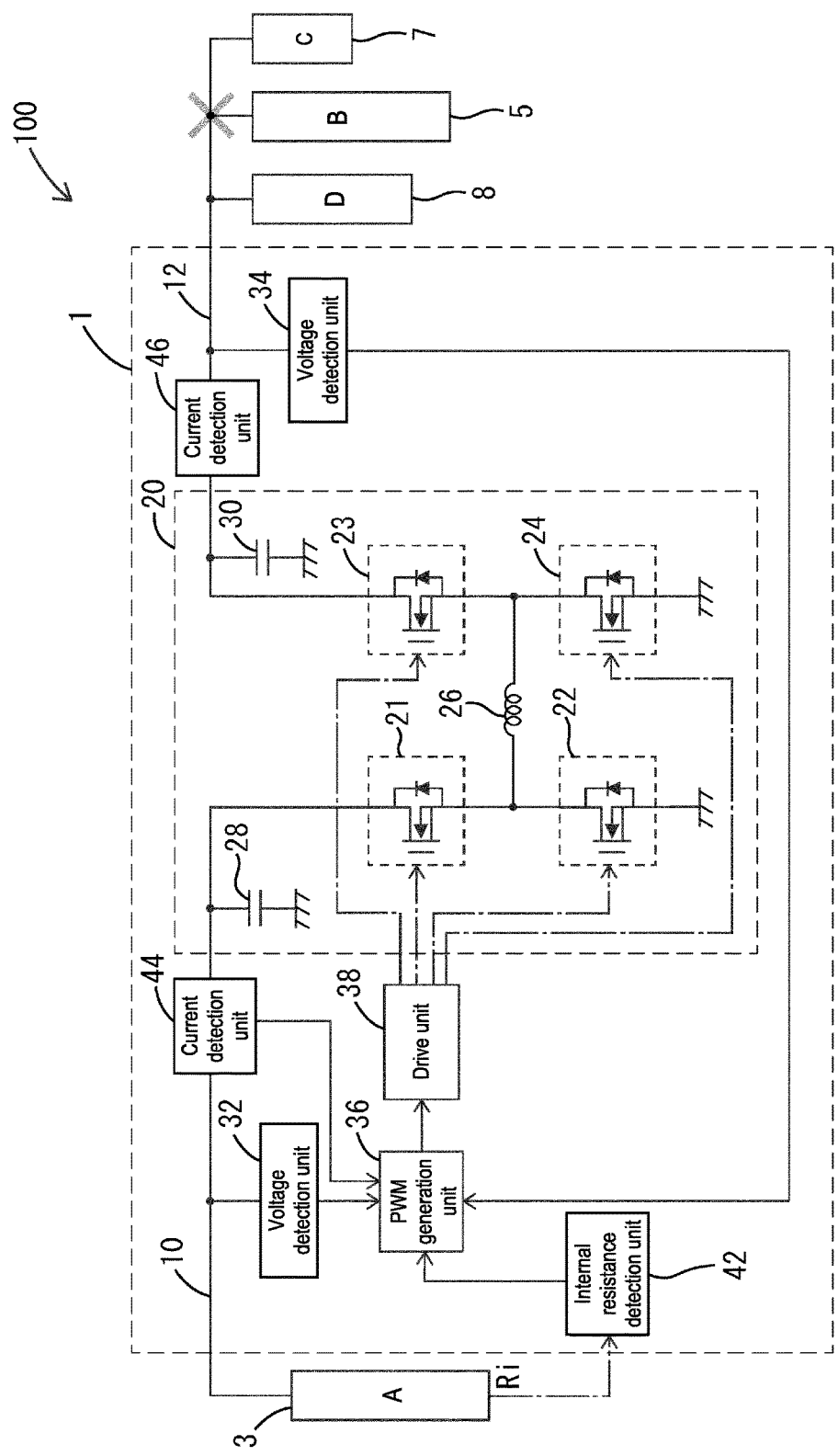
FIG. 5 is a block diagram conceptually illustrating a state where an anomaly has occurred on a second conduction path side during the first operation in the voltage conversion device of the first embodiment.

For example, when the voltage of the conduction path 12 suddenly drops due to a ground fault, disconnection or the like as shown in FIG. 5 when the voltage conversion unit 20 is performing the step-up operation as shown in FIG. 4, the difference (second deviation ΔV2) between the voltage (second voltage value V2) of the conduction path 12 and the second target value Vt2 increases. When the second deviation ΔV2 increases in this way, the second duty D2 that is calculated by the feedback operation also increases. When the second duty D2 becomes larger than the inverted duty Dr due to such a change, the second duty D2 is selected by the selection unit 84. In other words, the second duty D2 is selected as the selected duty Ds by the selection unit 84. In the output unit 94 shown in FIG. 3, a value (D2+ΔD) obtained by adding the second duty D2 and the correction value ΔD is then set as the usage duty Du. Accordingly, a PWM signal based on the second duty D2 (specifically, PWM signal whose duty is set to (D2+ΔD)) will be input to the drive unit 38 shown in FIG. 2.

The drive unit 38 inputs a PWM signal of the same duty as a PWM signal obtained by inverting the PWM signal input thereto (PWM signal whose duty is set to (D2+ΔD)) to the switching element 22 (second switching element). Also, the drive unit 38 inputs a PWM signal of the same duty as the PWM signal that is input thereto to the switching element 21 (first switching element). In this case, a PWM signal whose duty is set to the second duty D2 is input to the switching element 21, and thus a step-down operation is performed to approximate the voltage value of the conduction path 12 (second conduction path) to the second target value Vt2. In this case, discharging is performed to supply power to the conduction path 10 side, based on the power of the first power unit 3, as shown conceptually by the bold arrow in FIG. 6. Note that, in the configuration of FIG. 6, if a switch is provided between the second power unit 5 and the critical load 8, the second power unit 5 and the critical load 8 can be electrically separated by turning off the switch, even when a ground fault occurs in proximity to the second power unit 5. In this case, power can be supplied to the critical load 8 at the time of discharging such as shown in FIG. 6.

Figure 6:
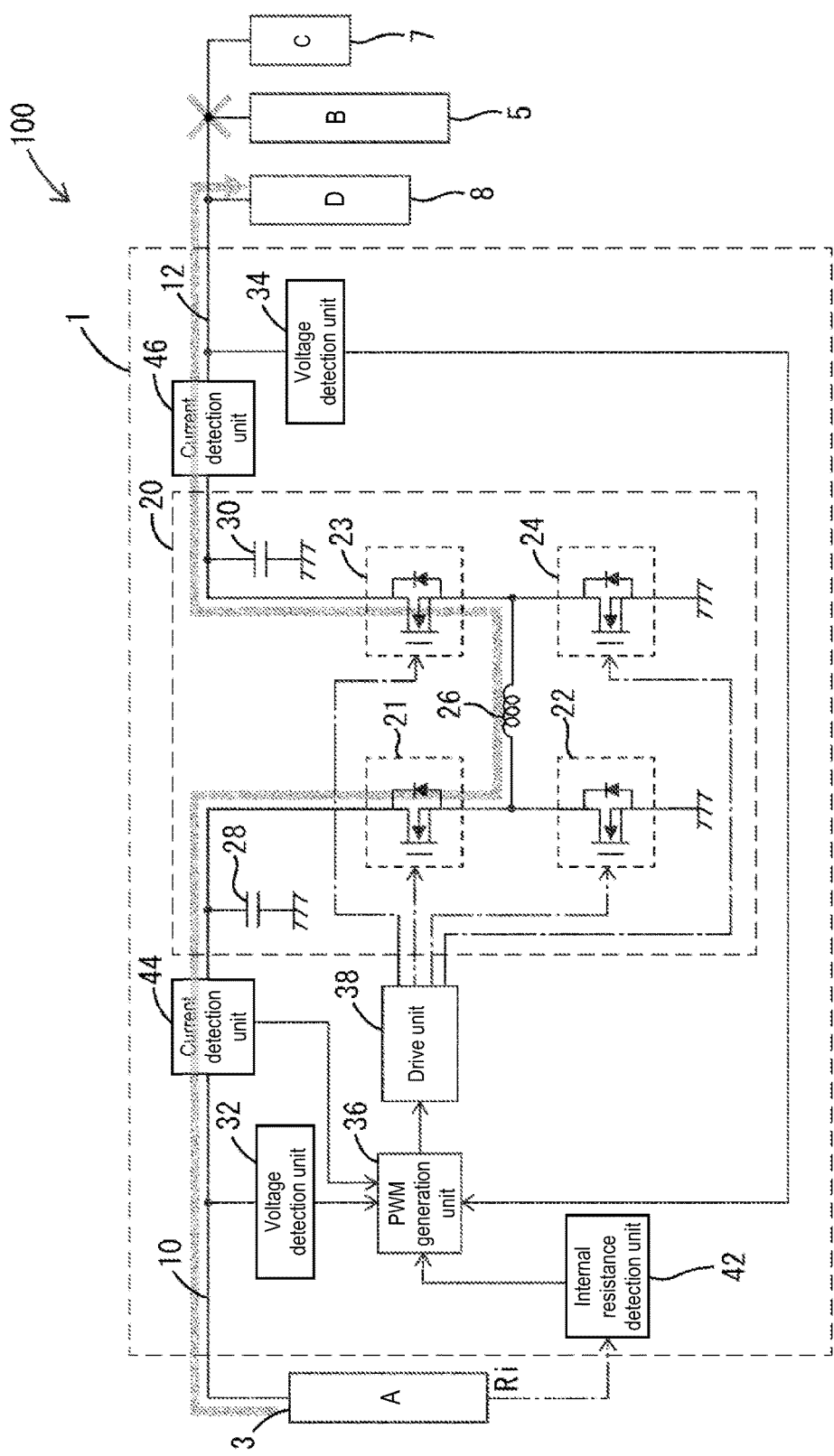
FIG. 6 is a block diagram conceptually illustrating a state of having switched from the first operation to a second operation after the occurrence of an anomaly such as shown in FIG. 5.

Also, when switching from a charging operation such as shown in FIG. 4 to a discharging operation such as shown in FIG. 6, the correction value ΔD can be suddenly reduced from a positive value to a negative value, with the amount of reduction increasing as the discharge current increases, and increasing as the internal resistance of the first power unit 3 increases. Therefore, the duty can be lowered in anticipation of a drop in the first voltage value caused by the change in direction of current on the conduction path 10 and a drop in output voltage (voltage of the conduction path 12) that depends on this drop in the first voltage value, allowing the voltage of the conduction path 12 to be readily approximated to the second target value Vt2 at an early stage.

Note that in the case where the inverted duty Da becomes larger for some reason when the second duty D2 is larger than the inverted duty Da (at the time of the step-down operation), switching to the abovementioned step-up operation (operation for charging the first power unit 3) is performed immediately.

Next, the effects of the present disclosure will be illustrated.

The voltage conversion device 1 is capable of continuously calculating/updating both the first duty D1 which is the duty for a first operation and the second duty D2 which is the duty for a second operation. Moreover, the voltage conversion device 1 determines the usage duty Du based on the larger value or smaller value from when "the inverted duty Dr which is a value obtained by subtracting the first duty D1 from 100 percent" and "the second duty D2" are compared. In other words, in the case where the magnitude relationship between the inverted duty Dr and the second duty D2 changes when one of the inverted duty Dr and the second duty D2 is being prioritized, the voltage conversion device 1 is able to immediately switch the duties to respond to the change.

Moreover, the voltage conversion device 1 determines the usage duty, based on the internal resistance Ri of the power unit, and the current value I1 of the first conduction path. Therefore, the voltage conversion device 1 is not only able to "switch the operation that is prioritized according to the magnitude relationship between the inverted duty Dr and the second duty D2" but is also able to determine the usage duty Du according to the current value I1 and the internal resistance Ri of the power unit.

In the voltage conversion device 1, the determination unit 83 can be provided with the selection unit 84, the calculation unit 92, and the output unit 94. The selection unit 84 can then operate to select the above larger value or the above smaller value. The calculation unit 92 can then calculate the correction value ΔD, based on the internal resistance Ri detected by the internal resistance detection unit and the current value I1 detected by the current detection unit 44. The output unit 94 can then determine the usage duty Du, based on a value obtained by adding the value selected by the selection unit 84 and the correction value ΔD calculated by the calculation unit 92, and can output a PWM signal whose duty is set to the usage duty Du. Furthermore, the calculation unit 92 can determine that the correction value ΔD so as to increase the absolute value of the correction value ΔD as the value Ri of internal resistance increases, and to increase the absolute value of the correction value ΔD as the current value I1 increases. Furthermore, the calculation unit 92 can determine the correction value ΔD so as to set the correction value ΔD to a positive value in the case where current flows through the first conduction path toward the power unit side, and to set the correction value ΔD to a negative value in the case where current flows through the first conduction path toward the voltage conversion unit 20 side.

In the case where the voltage conversion device 1 switches from the first operation to the second operation (operation in opposite direction) when current is flowing toward the power unit through the first conduction path due to the first operation, for example, the power unit enters a backflow state so as to switch from a charging state to a discharging state. When a backflow occurs in this way, the voltage (input voltage) of the first conduction path drops greatly, and thus the output voltage that is applied to the second conduction path also drops due to the drop in input voltage in the second operation that is performed thereafter. In this case, the output voltage that is applied to the second conduction path drops greatly before stabilizing to approximate a target value (second target value Vt2), although the voltage takes time to stabilize when some sort of measure is not implemented. In contrast, with the voltage conversion device 1, the correction value ΔD is determined so as to be a negative value in the case where the current flows toward the voltage conversion unit 20 side, and thus correction that reduces the usage duty Du in the case where the power unit switches from the charging state to the discharging state becomes possible. In other words, the voltage conversion device 1 is able to perform correction so as to lower the duty at an early stage assuming that the output voltage of the second conduction path will decrease in response to switching to the backflow state. Therefore, the voltage conversion device 1 is able to shorten the time for the output voltage that is applied to the second conduction path to stabilize in proximity to the target value (second target value Vt2) in the case of switching from the first operation to the second operation.

Also, the voltage drop that occurs on the first conduction path in the case of switching from the first operation to the second operation increases as the discharge current that flows through the first conduction path increases, and increases as the internal resistance of the power unit increases. Therefore, if the correction value is determined so as to increase the absolute value of the correction value as the value of internal resistance increases, and to increase the absolute value of the correction value as the current value increases, correction that lowers the usage duty as the voltage drop on the first conduction path increases becomes possible.

Second Embodiment

Next, a second embodiment will be described with reference to FIG. 7.

A voltage conversion device 201 of the second embodiment differs from the voltage conversion device 1 of the first embodiment only with respect to a PWM generation unit 236 and a drive unit 238, and is otherwise similar to the voltage conversion device 1 of the first embodiment. Specifically, the voltage conversion device 201 differs from the voltage conversion device 1 of the first embodiment only with respect to a duty generation unit 273, a duty generation unit 279 and the drive unit 238, and is otherwise similar to the voltage conversion device 1 of the first embodiment. Also, portions other than the voltage conversion device 201 in the power system to which the voltage conversion device 201 is applied are similar to portions other than the voltage conversion device 1 in the power system 100 shown in FIG. 1. The hardware configuration of a control circuit 271 is similar to the control circuit 71, and differs from the control circuit 71 only with respect to internal functions. An arbitration unit 272 differs from the arbitration unit 72 only with respect to the duty generation units 273 and 279.

Figure 7:
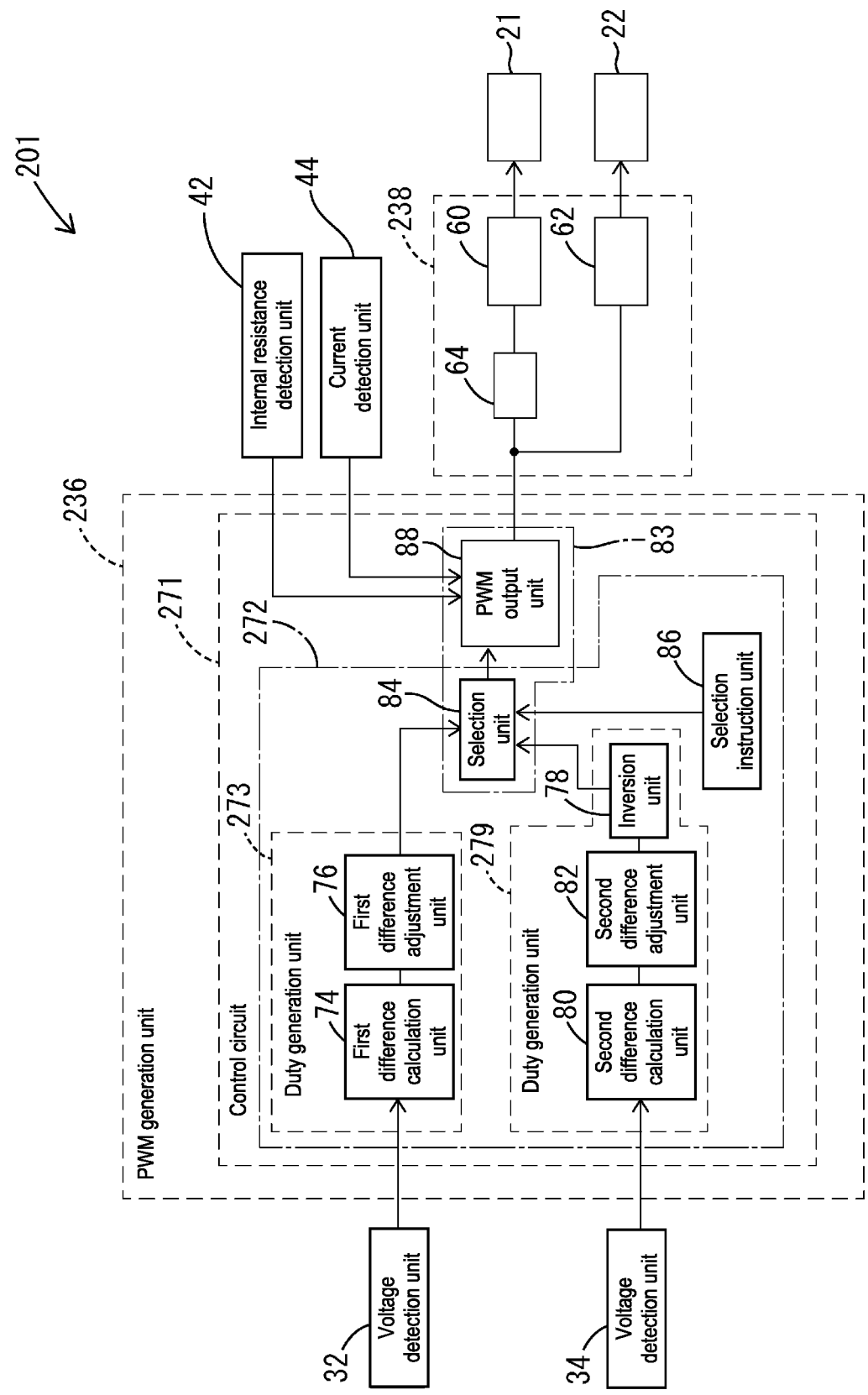
FIG. 7 is a block diagram conceptually illustrating part of a voltage conversion device of a second embodiment.

In the voltage conversion device 201 shown in FIG. 7, the duty generation unit 273 differs from the duty generation unit 73 that is used in the first embodiment only with respect to the inversion unit 78 being omitted, and is otherwise similar to the duty generation unit 73 and functions similarly. The duty generation unit 273 provides a first duty D1 generated by a first difference adjustment unit 76 to a selection unit 84.

In the voltage conversion device 201 shown in FIG. 7, the duty generation unit 279 differs from the duty generation unit 79 that is used in the first embodiment only with respect to being provided with an inversion unit 78, and is otherwise similar to the duty generation unit 79 and functions similarly. The duty generation unit 279 provides an inverted duty Dr which is a duty obtained by subtracting a second duty D2(%) generated by a second difference adjustment unit 82 from 100(%) to the selection unit 84. In this example, Dr=100−D2.

In this example, the selection unit 84 and a selection instruction unit 86 operate similarly to the first embodiment. The selection unit 84 selects the larger value or smaller value from when the inverted duty Dr (value obtained by subtracting second duty D2 from 100%) and the first duty D1 are compared. Note that, hereinafter, the value selected by the selection unit 84 will also be referred to as a selected duty Ds. For example, if the selection instruction unit 86 instructs selection of "the larger value", the selection unit 84 selects "the larger value", and if the selection instruction unit 86 instructs selection of "the smaller value", the selection unit 84 selects "the smaller value".

A determination unit 83 has a similar configuration to the first embodiment and functions similarly. This determination unit 83 determines a usage duty Du, based on the larger value or smaller value (specifically, selected duty Ds) from when the inverted duty Dr and the first duty D1 are compared, an internal resistance Ri, and the current value of a conduction path 10.

In this example, a calculation unit 92 functions similarly to the first embodiment, and determines a correction value ΔD, based on the internal resistance detected by an internal resistance detection unit and the current value detected by a current detection unit. Specifically, the calculation unit 92 calculates the correction value ΔD with the abovementioned equation 1. The output unit 94 then determines the usage duty Du, based on a value (Ds+ΔD) obtained by adding the value (selected duty Ds) selected by the selection unit 84 and the correction value ΔD calculated by the calculation unit 92. Specifically, Du=Ds+ΔD. The output unit 94 then outputs a PWM signal set to the usage duty Du. The PWM signal set to the duty Du that is output by an output unit 94 is input to the drive unit 238.

The drive unit 238 inputs a PWM signal that depends on the usage duty Du determined by the determination unit 83 to one of a first switching element and a second switching element. In the example in FIG. 7, a switching element 22 (second switching element) corresponds to an example of one switching element. Also, the drive unit 238 inputs an inverted signal obtained by inverting the PWM signal that depends on the usage duty Du determined by the determination unit 83 to the other switching element. In the example in FIG. 7, a switching element 21 (first switching element) corresponds to an example of the other switching element. In this way, the drive unit 238 drives the voltage conversion unit 20, by generating PWM signals that are complementary to each other and providing the PWM signals to the gates of the switching elements 21 and 22.

The drive unit 238 is provided with FET drive circuits 60 and 62 and a PWM inversion circuit 64, and the FET drive circuits 60 and 62 and the PWM inversion circuit 64 operate similarly to respective units in the first embodiment.

The FET drive circuit 62 outputs a PWM signal of comparable duty to the duty of the input PWM signal (PWM signal output by PWM output unit 88). The FET drive circuit 62 provides an ON signal to the gate of the switching element 22 during the period in which the input PWM signal (PWM signal output by PWM output unit 88) is a high-level signal. Also, the FET drive circuit 62 provides an OFF signal to the gate of the switching element 22 during the period in which the input PWM signal is a low-level signal. The ON signal that the FET drive circuit 62 provides to the gate of the switching element 22 is set to a voltage that can turn on the switching element 22.

The PWM inversion circuit 64 functions to invert the PWM signal output by the PWM generation unit 36. The PWM inversion circuit 64 outputs a low-level signal during the period in which the input PWM signal (PWM signal output by PWM output unit 88) is a high-level signal, and outputs a high-level signal during the period in which the input PWM signal is a low-level signal.

The FET drive circuit 60 outputs a PWM signal of comparable duty to the duty of the input PWM signal (PWM signal output by PWM inversion circuit 64). The FET drive circuit 60 provides an ON signal to the gate of the switching element 21 during the period in which the input PWM signal (PWM signal output by PWM inversion circuit 64) is a high-level signal. In other words, the FET drive circuit 60 provides an ON signal to the gate of the switching element 21 during the period in which the PWM signal output by PWM output unit 88 is a low-level signal. Also, the FET drive circuit 60 provides an OFF signal to the gate of the switching element 21 during the period in which the input PWM signal is a low-level signal. In other words, the FET drive circuit 60 provides an OFF signal to the gate of the switching element 21 during the period in which the PWM signal output by PWM output unit 88 is a high-level signal. The ON signal that the FET drive circuit 62 provides to the gate of the switching element 21 is set to a voltage that can turn on the switching element 21.

Here, the case where the selection instruction unit 86 shown in FIG. 2 sets (instructs) selection of "the larger value" will be described. In this case, if the inverted duty Dr is larger than the first duty D1, the inverted duty Dr will be selected as the selected duty Ds by the selection unit 84. In the output unit 94 shown in FIG. 3, a value (Dr-FAD) obtained by adding the inverted duty Dr and the correction value ΔD is set as the usage duty Du. Accordingly, a PWM signal that is based on the inverted duty Dr (specifically, PWM signal whose duty is set to (Dr+ΔD)) will be input as the PWM signal to the drive unit 238 shown in FIG. 7.

The drive unit 238 inputs a PWM signal of the same duty as a PWM signal obtained by inverting the PWM signal input thereto (PWM signal whose duty is set to (Dr+ΔD)) to the switching element 21 (first switching element). Also, the drive unit 238 inputs a PWM signal of the same duty as the PWM signal that is input thereto to the switching element 22 (second switching element). In this case, a PWM signal whose duty is set to the second duty D2 is input to the switching element 21, and thus a step-down operation is performed to approximate the voltage value of the conduction path 12 (second conduction path) to the second target value Vt2.

Conversely, if the first duty D1 is larger than the inverted duty Dr, the first duty D1 will be selected as the selected duty Ds by the selection unit 84. In the output unit 94 shown in FIG. 3, a value (D1+ΔD) obtained by adding the first duty D1 and the correction value ΔD is then set as the usage duty Du. Accordingly, a PWM signal that is based on the first duty D1 (specifically, PWM signal whose duty is set to (D1+ΔD)) will be input as the PWM signal to the drive unit 238 shown in FIG. 7.

The drive unit 238 inputs a PWM signal of the same duty as a PWM signal obtained by inverting the PWM signal input thereto (PWM signal whose duty is set to (D1+ΔD)) to the switching element 21 (first switching element). Also, the drive unit 238 inputs a PWM signal of the same duty as the PWM signal that is input thereto to the switching element 22 (second switching element). In this case, a PWM signal whose duty is set to the first duty D1 is input to the switching element 22, and thus a step-up operation is performed to approximate the voltage value of the conduction path 10 (first conduction path) to the first target value Vt1.

In this example, the correction value ΔD can similarly be suddenly reduced from a positive value to a negative value, when switching from a charging operation (step-up operation) for charging the first power unit 3 to a discharging operation (step-down operation) for discharging the first power unit 3. The amount of reduction in the correction value ΔD increases as the discharge current increases, and increases as the internal resistance of the first power unit 3 increases. Therefore, the duty can be lowered in anticipation of a drop in the first voltage value caused by the change in direction of current on the conduction path 10 and a drop in output voltage (voltage of the conduction path 12) that depends on this drop in the first voltage value, allowing the voltage of the conduction path 12 to be readily approximated to the second target value Vt2 at an early stage.

Other Embodiments

The present disclosure is not limited to the embodiments illustrated in the above description and drawings, and may be modified as follows, for example. Also, all combinations of the features of embodiments described above and below are possible as long as there are no inconsistencies. Any of the features of embodiments described above and below can also be omitted if not explicitly indicated as being essential.

The above embodiments illustrate examples in which the second power unit 5 is caused to function as a main power source and the first power unit 3 is caused to function as an auxiliary power source, but the first power unit 3 may be caused to function as a main power source, and the second power unit 5 may be caused to function as an auxiliary power source.

The above embodiments illustrate examples of the first conduction path, the second conduction path, the power unit, the first voltage detection unit, the first voltage value, the second voltage detection unit, the second voltage value, the first switching element and the second switching element, but the invention is not limited to the examples of the above embodiments. For example, the conduction path 10 may be the second conduction path, the conduction path 12 may be the first conduction path, and the second power unit 5 may be the power unit. In this case, the voltage detection unit 32 may be the second voltage detection unit, the voltage value of the conduction path 10 may be the second voltage value, the voltage detection unit 34 may be the first voltage detection unit, and the voltage value of the conduction path 12 may be the first voltage value. Also, the switching element 22 may be the first switching element, and the switching element 21 may be the second switching element. In this case, the current detection unit 46 can be caused to function as a portion that detects the current value that flows through the first conduction path. Also, the internal resistance detection unit 42 can be caused to function as a portion that detects the internal resistance of the second power unit 5 (power unit). In this example, the duty generation unit 73 can be the second duty generation unit, and the duty generation unit 79 can be the first duty generation unit. In this example, the second duty is generated by the first difference adjustment unit 76, and the first duty that is generated by the second difference adjustment unit 82. Also, in this example, the critical load 8 and the load 7 may be electrically connected to the conduction path 12, or may be electrically connected to the conduction path 10.

In this example, the duty generation unit 79 generates a first duty for approximating the voltage value of the conduction path 12 to a first target value by a feedback operation that is based on the voltage value of the conduction path 12 and the first target value. The duty generation unit 73 generates a second duty for approximating the voltage value of the conduction path 10 to a second target value by a feedback operation that is based on the voltage value of the conduction path 10 and the second target value.

A selection unit then selects the larger value or smaller value from when an inverted duty which is a value obtained by subtracting the second duty generated by the first difference adjustment unit 76 from 100 percent and a first duty generated by the second difference adjustment unit 82 are compared. The selection method is similar to the above embodiments.

The determination unit 83 determines the usage duty Du, based on the value selected by the selection unit, the internal resistance of the second power unit 5 detected by the internal resistance detection unit 42, and the current value of the conduction path 12 detected by the current detection unit 46.

In this example, the calculation unit 92 functions similarly to FIG. 3, and calculates the correction value ΔD with the abovementioned equation 1, based on the internal resistance detected by the internal resistance detection unit 42 and the current value detected by the current detection unit 46. The output unit 94 then determines a value (Ds-FAD) obtained by adding the value (selected duty Ds) selected by the selection unit 84 and the correction value Δ calculated by the calculation unit 92 as the usage duty Du, and outputs a PWM signal set to the usage duty Du.

The drive unit 38 inputs a PWM signal of the same duty as a PWM signal obtained by inverting the PWM signal input thereto (PWM signal whose duty is set to (Ds+ΔD)) to the switching element 22 (first switching element). Also, the drive unit 38 inputs a PWM signal of the same duty as the PWM signal that is input thereto to the switching element 21 (second switching element).

For example, if the inverted duty is larger than the first duty, a PWM signal whose duty is set to the second duty is input to the switching element 22. Therefore, in this case, a step-up operation is performed to approximate the voltage value of the conduction path 10 (second conduction path) to the second target value.

Also, if the first duty is larger than the inverted duty, a PWM signal whose duty is set to the first duty is input to the switching element 21. Therefore, in this case, a step-up operation is performed to approximate the voltage value of the conduction path 12 (first conduction path) to the first target value.

Note that, similarly, in this example, the switching element 23 need only be turned on and the switching element 24 need only be turned off during the step-up operation and step-down operation.

In the above embodiments, the voltage value V2 of the second conduction path is used in equation 1, but a fixed value may be used instead of the voltage value of the second conduction path.

The embodiments disclosed herein are to be considered illustrative in all respects and not restrictive. The scope of the invention is not limited to the embodiments disclosed herein, and is defined by the claims, and all changes that come within the meaning and range of equivalency of the claims are intended to be embraced therein.

The invention claimed is:

1. A voltage conversion device having a voltage conversion unit including a first switching element and a second switching element and configured to perform voltage conversion with one of a first conduction path and a second conduction path that are electrically connected to a power unit as an input side and the other thereof as an output side, a first voltage detection unit configured to detect a first voltage value which is a voltage value of the first conduction path, and a second voltage detection unit configured to detect a second voltage value which is a voltage value of the second conduction path, the voltage conversion unit performing a first operation for stepping up or stepping down an input voltage applied to the second conduction path by an on/off operation of the second switching element and applying an output voltage to the first conduction path, and a second operation for stepping up or stepping down an input voltage applied to the first conduction path by an on/off operation of the first switching element and applying an output voltage to the second conduction path, the voltage conversion device comprising:

a current detection unit configured to detect a current value of the first conduction path;

an internal resistance detection unit configured to detect an internal resistance of the power unit;

a first duty generation unit configured to generate a first duty for approximating the voltage value of the first conduction path to a first target value by a feedback operation based on the voltage value of the first conduction path and the first target value;

a second duty generation unit configured to generate a second duty for approximating the voltage value of the second conduction path to a second target value by a feedback operation based on the voltage value of the second conduction path and the second target value;

a determination unit configured to determine a usage duty, based on the first duty and the second duty; and a drive unit configured to input a PWM signal that depends on the usage duty determined by the determination unit to one of the first switching element and the second switching element, and to input an inverted signal obtained by inverting the PWM signal to the other switching element, wherein the determination unit determines the usage duty, based on a larger value or a smaller value from when an inverted duty which is a value obtained by subtracting one of the first duty and the second duty from 100 percent and the other duty are compared, the internal resistance detected by the internal resistance detection unit, and the current value detected by the current detection unit.

2. The voltage conversion device according to claim 1, wherein the determination unit has:

a selection unit configured to select the larger value or the smaller value;

a calculation unit configured to calculate a correction value, based on the internal resistance detected by the internal resistance detection unit and the current value detected by the current detection unit; and an output unit configured to determine the usage duty, based on a value obtained by adding the value selected by the selection unit and the correction value calculated by the calculation unit, and output a PWM signal set to the usage duty, and the calculation unit determines the correction value so as to increase an absolute value of the correction value as a value of the internal resistance increases, and to increase the absolute value of the correction value as the current value increases, and so as to set the correction value to a positive value if current flows through the first conduction path toward the power unit side, and to set the correction value to a negative value if current flows through the first conduction path toward the voltage conversion unit side.

* * * * *